US008561074B2

(12) United States Patent
Cherkasova et al.

(10) Patent No.: US 8,561,074 B2
(45) Date of Patent: Oct. 15, 2013

(54) ENHANCED BACKUP JOB SCHEDULING

(75) Inventors: Ludmila Cherkasova, Sunnyvale, CA (US); Xin Zhang, San Jose, CA (US); Xiaozhou Li, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 374 days.

(21) Appl. No.: 12/950,887

(22) Filed: Nov. 19, 2010

(65) Prior Publication Data

US 2012/0131583 A1    May 24, 2012

(51) Int. Cl.
*G06F 9/46* (2006.01)

(52) U.S. Cl.
USPC ............ 718/102; 718/100; 718/104; 718/105

(58) Field of Classification Search
USPC .......................... 718/100, 102, 103, 104, 105
See application file for complete search history.

(56) References Cited

U.S. PATENT DOCUMENTS

| | | | | |
|---|---|---|---|---|
| 5,392,430 A * | 2/1995 | Chen et al. | ................... | 718/102 |
| 5,673,381 A * | 9/1997 | Huai et al. | ..................... | 714/1 |
| 6,934,724 B1 * | 8/2005 | Deshayes et al. | ................. | 1/1 |
| 8,091,087 B2 * | 1/2012 | Ali et al. | ..................... | 718/102 |
| 8,321,644 B2 * | 11/2012 | Cherkasova et al. | ............. | 711/162 |
| 2008/0244601 A1 * | 10/2008 | Zeis et al. | ..................... | 718/104 |
| 2008/0263551 A1 * | 10/2008 | Ali et al. | ..................... | 718/102 |
| 2010/0257326 A1 * | 10/2010 | Otani et al. | .................... | 711/162 |

OTHER PUBLICATIONS

Sun et al. "Scheduling problems with multiple maintenance activities and non-preemptive jobs on two identical parallel machines", International Journal of Production Economics, 124 (2010), pp. 151-158.*
Cherkasova et al. "DP+IP=design of efficient backup scheduling", International Conference on Network and Service Management (CNSM), Oct. 25-29, 2010, pp. 118-125.*

* cited by examiner

*Primary Examiner* — Emerson Puente
*Assistant Examiner* — Willy W Huaracha

(57) ABSTRACT

Systems and methods of enhanced backup job scheduling are disclosed. An example method may include determining a number of jobs (n) in a backup set, determining a number of tape drives (m) in the backup device, and determining a number of concurrent disk agents (maxDA) configured for each tape drive. The method may also include defining a scheduling problem based on n, m, and maxDA. The method may also include solving the scheduling problem using an integer programming (IP) formulation to derive a bin-packing schedule that minimizes makespan (S) for the backup set.

19 Claims, 5 Drawing Sheets

ENHANCED BACKUP JOB SCHEDULING

BACKGROUND

An ongoing challenge for information technology (IT) departments is effectively backing up and protecting the vast amounts of data stored throughout the enterprise. The increase in electronic documents and other files, along with regulations and retention rules for data backup, has only led to a higher demand for performance efficiency in data protection and archival tools. It is estimated that 60% to 70% of the effort associated with storage management is related to backup and recovery.

While there are a growing variety of systems and services that provide efficient file system backups over the Internet, the traditional tape-based (and virtual tape) backup is still preferred in many enterprise environments, particularly for long-term data backup and data archival. Consequently, many organizations have significant amounts of backup data stored on tape (or virtual tapes), and those organizations are interested in improving performance of their tape-based data protection solutions.

DETAILED DESCRIPTION

Typically, a tape-based backup solution has a configuration parameter which defines a level of concurrency (i.e., the number of concurrent processes, also referred to as "disk agents"), which can backup different objects across multiple tapes in parallel. But the backup and restore operations still involve many manual processes, and therefore are labor intensive. There is little or no information on the expected duration and throughput requirements of different backup jobs. This may lead to suboptimal scheduling and longer backup session times.

The systems and methods described herein may be used to automate design of a backup schedule which reduces or minimizes overall completion time for a given set of backup jobs by automating the parameter for setting concurrent disk agents per tape drive to enhance the tape drive throughput. In an example embodiment, an integer programming (IP) formulation is implemented using IP-solvers (e.g., CPLEX) for finding an enhanced or optimized schedule, referred to herein as a "bin-packing" schedule.

The same approach can be applied to job scheduling for incremental backups. In such an embodiment, each backup job is characterized by two metrics, referred to herein as "job duration" and "job throughput." These metrics are derived from collected historic information about backup jobs during previous backup sessions. The design of a backup schedule can then be designed which minimizes the overall completion time for a given set of backup jobs. In an example embodiment, the design may be formulated as a resource constrained scheduling problem where a set of n jobs should be scheduled on m machines with given capacities. A general IP formulation of the backup job scheduling problem is provided for multiple tape drive configurations, and an improved and more compact IP formulation for the case of a single drive configuration may be designed using IP-solvers to find an optimized schedule (the bin-packing job schedule).

The new bin-packing schedule provides upwards of a 60% reduction in backup time. This significantly reduced backup time results in improved resource/power usage and price/performance ratios of the overall backup solution.

Figure 1:
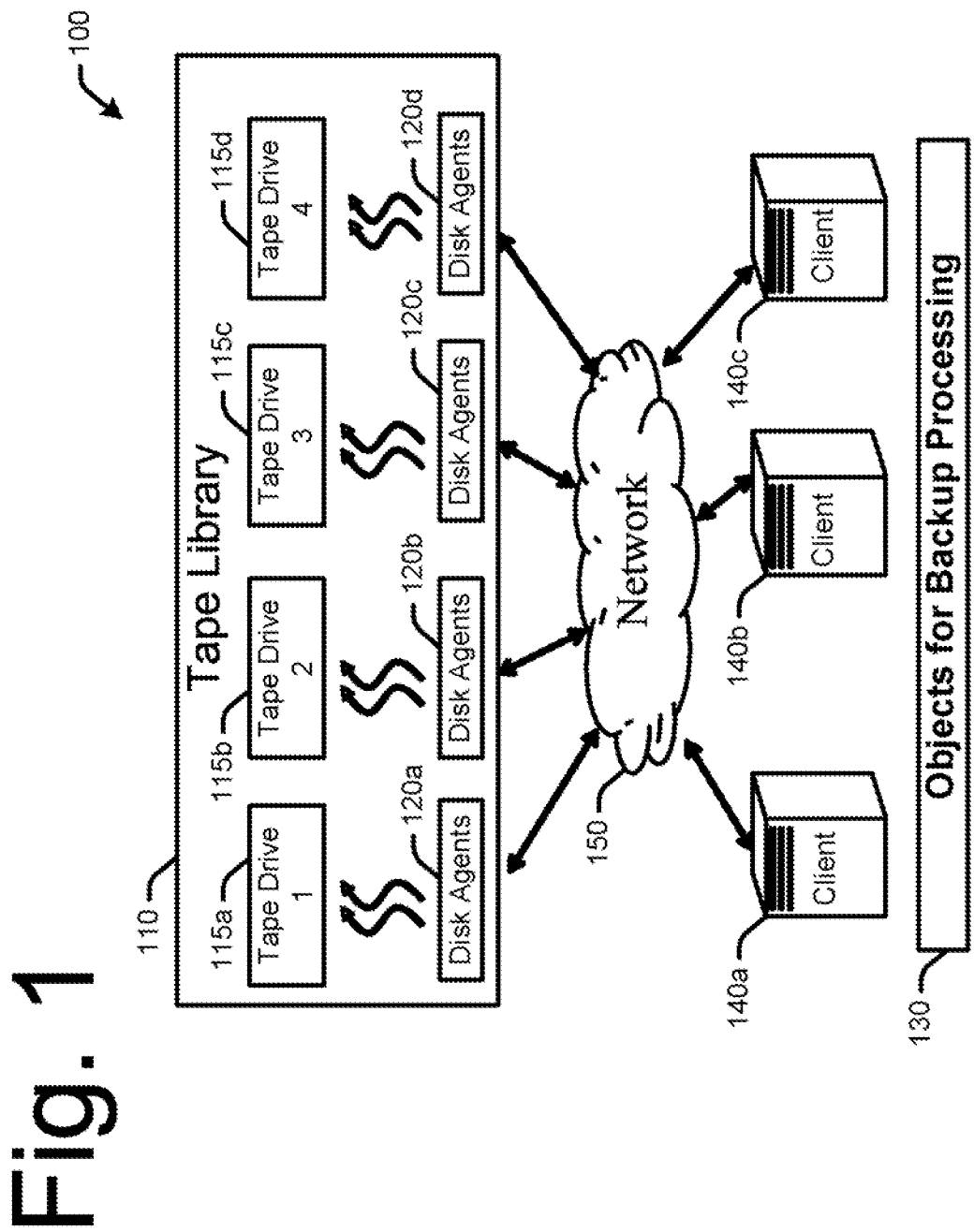
FIG. 1 is a high-level diagram showing an example backup system which uses a tape library.

FIG. 1 is a high-level diagram showing an example backup system 100 which uses a tape library 110 with a plurality of tape drives 115a-d. It is noted that the tape library 110 may include actual physical tapes/drives, logical "tapes/drives" or a combination thereof. The software processes, referred to as disk agents 120a-d (or DAs), are associated with each tape drive 115a-d. Each disk agent is responsible for backing up a single object at a time.

Each tape drive 115a-d has a configuration parameter which defines a concurrency level (i.e., the number of concurrent disk agents which can backup different objects 130 in parallel to the tape drive 115a-d). A single data stream may not be able to fully utilize the capacity/bandwidth of the backup tape drive 115a-d due to slow client devices 140a-c. For example, a typical throughput of a client device is 10-20 MB/s. Therefore, a system administrator can configure a high number of disk agents 120a-d for each tape drive 115a-d to enable concurrent backup of different objects 130 at the same time. Of course, the data streams from many different objects 130 are interleaved on the tape, and when the data of a particular object 130 needs to be restored, there is a higher restoration time for retrieving such data, for example, as compared to a continuous data stream written by a single disk agent.

Before continuing, it is noted that client devices (or "clients") 140a-c may include any of a wide variety of computing systems, such as a stand-alone personal desktop or laptop computer (PC), workstation, personal digital assistant (PDA), or appliance, to name only a few examples. Each of the client devices 140a-c may include memory, storage, and a degree of data processing capability at least sufficient to manage a connection to the tape library 110 either directly or via a network 150. Client devices 140a-c may connect to network 110 via a suitable communication connection, including but not limited to an Internet service provider (ISP).

There are a few potential problems with a traditional backup solution which may cause inefficient backup processing. When a group of n objects 130 is assigned to be processed by the backup device (e.g., library 110), there is no way to enforce an order in which these objects should be processed. If a large (or slow) object 130 with a long backup time is selected significantly later in the backup session, this leads to an inefficient schedule and an increased overall backup time.

Also, when configuring the backup device (e.g., library 110), a system administrator should not over-estimate the number of concurrent DAs 120a-d that will be needed to handle the backup operations. The data streams from these concurrent DAs 120a-d are interleaved on the tape, and may therefore lead to a higher restoration time for retrieving such data. Moreover, when the aggregate throughput of concurrent streams exceeds the throughput of the specified tape drive 115a-d, it may increase the overall backup time. Often the backup time of a large object 130 dominates the overall backup time. Too many concurrent data streams written at the same time to the tape drive 115a-d might decrease the effective throughput of each stream, and therefore, unintentionally increase the backup time of large objects 130 and result in higher the overall backup times.

Accordingly, the systems and methods described herein may be utilized so that the backup job scheduling and configuration may be tailored based on the available historical information and the workload profile.

In order to better understand the systems and methods disclosed herein, however, it is useful to explain the LBF job scheduling mechanism and use this as a comparison basis. According to the LBF job scheduling mechanism, information about the job durations from the previous full backup may be used for an upcoming full backup. At this phase, an ordered list of objects is created and sorted in decreasing order of the backup durations. For purposes of illustration, the ordered list may be expressed as:

$$OrdObjList=\{(O_1, Dur_1), \ldots, (O_n, Dur_n)\}$$

where: $Dur_3$ denotes the backup duration of object $O_3$; and $Dur_1 \geq Dur_2 \geq Dur_3 \geq \ldots \geq Dur_7 \ldots$ If there are m tape drives ($Tape_1, \ldots Tape_m$), and each tape drive is configured with k disk agents, then the following running counters may be established for each tape drive:

$DiskAgent_i$: a counter of available disk agents for $Tape_i$; and $TapeProcTime_i$: a counter of overall processing time assigned to $Tape_i$.

For each tape drive $Tape_i$ (1<i<m) these counters are initialized as follows:

$DiskAgent_i$=k, $TapeProcTime_i$=0.

The iteration step of the algorithm is described as follows. Let ($O_j, Dur_j$) be the top object in the OrdObjList, and let $$TapeProcTime_r = \min_{1 \leq i \leq m \& DiskAgent_i > 0}(TapeProcTime_i),$$

The tape drive $Tape_r$ has the smallest assigned processing time, and still has an available DA for processing the object $O_j$. Accordingly, object $O_j$ is assigned for processing to the tape drive $Tape_r$, and the running counters of this tape drive $Tape_r$ are updated as follows:

$TapeProcTime_r \Leftarrow TapeProcTime_r + Dur_j$, $DiskAgent_r \Leftarrow DiskAgent_r - 1$.

The longest jobs for processing are assigned first. In addition, the job is assigned to concurrent DAs in such a way that the overall amount of processing time assigned to different tape drives is balanced. Once the objects are assigned to the available DAs, the backup processing can start. When a DA at a tape drive $Tape_r$ completes the backup of the assigned object, the running counter of this tape drive $Tape_r$ is updated as follows:

$DiskAgent_r \Leftarrow DiskAgent_r + 1$.

The DA of this tape drive $Tape_r$ is assigned the next available object from the OrdObjList, the running counters are updated again, and the backup process continues. According to the LBF job schedule mechanism, each tape drive concurrently processes a constant number (k) of jobs independent of aggregate throughput.

On the other hand, the systems and methods of the present disclosure implement an integer programming formulation of the multiple machine resource constrained scheduling problem. The systems and methods minimize the makespan (i.e., the overall completion time) of a given set of backup jobs for processing by multiple tape drives 115a-d. Accordingly, the systems and methods described herein provide a compact problem formulation that can be efficiently solved with IP solvers (e.g., CPLEX) in a reasonable compute time.

To determine scheduling for multiple tape drives 115a-d, the number of jobs in the backup set is represented by n; and the number of tape drives 115a-d in the backup device (e.g., library 110) is represented by m. The schedule is defined by a given set of n backup jobs that has to be processed by m tape drives 115a-d with given performance capacities. The maximum number of concurrent DAs 120a-d configured for each tape drive 115a-d is represented by maxDA; and the aggregate throughput of the tape drive 115a-d is represented by maxTput.

Each tape library 110 is homogeneous, but there may be different generation tape libraries in the overall set. Each job j, 1≤j≤n in a given backup set is defined by a pair of attributes ($d_3, w_3$), where $d_3$ is the duration of job j, and $w_3$ is the throughput of job j (e.g., the throughput of the tape drive 115a-d or the resource demand of job j).

At any time, each tape drive 115a-d can process up to maxDA jobs in parallel but the total "width" of these jobs cannot exceed the capacity of the tape drive 115a-d (maxTput). The objective is to find a schedule that minimizes the processing makespan and minimizes the overall completion time for a given set of backup jobs.

In an example, the variables may be defined as follows. $R_{ij}$ is a 0/1 variable, indicating whether backup job i is assigned to tape drive j at some point in time. $Y_{it}$ is a 0/1 variable, indicating whether job i starts processing at time t. $Z_{ijt}$ is a continuous variable (acting as $R_{ij} \cdot Y_{it}$) indicating whether job i is in processing on tape drive j at time t. S is the makespan of the entire backup session.

First, the low bound on the makespan S is approximated. The nature of a given backup workload and the tape library configuration parameters define the following three low bounds on makespan S. $D_1$ represents the duration of the longest backup job in the given set:

$$D_1 = \max_{1 \leq i \leq n} d_i$$

The makespan S (i.e., duration of the entire backup session) cannot be smaller than the longest backup job in the set.

$D_2$ is the shortest possible time that is required to process the entire set of submitted backup jobs at maximum tape drive throughput maxTput (multiplied by the number of tape drives).

$$D_2 = \frac{\sum_{1 \leq i \leq n} d_i \cdot w_i}{m \cdot \text{max}Tput}$$

This time represents the ideal processing of "all the bytes" in the given set of backup jobs at the maximum tape drive rate without any other configuration constraints of the backup server. Therefore, makespan S cannot be smaller than the "ideal" processing time of the backup set.

$D_3$ is the shortest possible time to process the entire set of submitted backup jobs while using the maximum possible number maxDA of concurrent disk agents at all tape drives.

This computation approximates the processing time for the case when maxDA parameter is a constraint that limits backup processing.

$$D_3 = \frac{\sum_{1 \le i \le n} d_i}{m \cdot \text{maxDA}}$$

Accordingly, makespan S cannot be smaller than $D_3$, and reflects the ideal processing time of the backup set with maxDA of concurrent disk agents.

In the IP formulation, estimates of the lower and upper bounds of makespan S are computed as follows.

$$M_{low} = \lceil \max(D_1, D_2, D_3) \rceil$$

$$M_{up} = \lceil \max(D_1, D_2, D_3)/0.951 \rceil$$

First, it is noted that $M_{up}$ is a lower bound on makespan S since it cannot be smaller than $D_1$, $D_2$, or $D_3$. However, $M_{up}$ is a possible approximation of the upper bound on makespan S, and the current estimate might be incorrect. The solution does not depend on $K_{up}$ in a direct way; as long as $S < M_{up}$ it leads to a feasible solution. If this guess makes the problem infeasible, the computation can be repeated for $M_{up}$ using 0.90, 085, etc. in the denominator, until the problem is feasible.

If $M_{up}$ is too large, then a higher complexity problem is created by introducing a higher number of equations and variables. However, if $M_{up}$ is too small, then the problem could be made infeasible. However, using 0.95 is a good starting estimate.

Next, the integer programming formulation is defined as follows. A job is processed by exactly one tape drive (total n equations):

$$\sum_{j=1}^{m} R_{ij} = 1, \forall i$$

Each job starts backup processing at some time before $t = c - d_i + 1$, where:

$$\sum_{i=1}^{M_{up}-d_1+1} Y_{it} = 1, \forall i$$

The jobs that are processed concurrently by tape drive j have to satisfy the tape drive capacity constraint (at any time t). That is, the jobs aggregate throughput requirements cannot exceed tape drive maximum throughput (total $m \cdot M_{up}$ inequalities).

$$\sum_{i=1}^{n} w_i \cdot \left( \sum_{t'=t-d_i+1}^{t} Z_{ijt'} \right) \le \text{maxTput}, \forall j, t$$

Maximum of maxDA concurrent jobs can be assigned to tape drive j at any point of time t.

$$\sum_{i=1}^{n} \left( \sum_{t'=t-d_i+1}^{t} Z_{ijt'} \right) \le \text{maxDA}, \forall j, t$$

Each job finishes the backup processing within time duration S, formally defining S as a makespan of the backup session. Next, the number of inequalities is optimized by considering only jobs i that were in processing at time $t \ge M_{low}$ (total $n(M_{up} - M_{low})$ inequalities).

$$t \cdot \left( \sum_{t'=t-d_i+1}^{t} Y_{i,t'} \right) \le S, \forall i, t: t \ge M_{low}$$

Linking $Z_{ijt}$ to binary variables $R_{ij}$ and $Y_{it}$ (total $n \cdot m \cdot M_{up}$ inequalities) gives:

$$Z_{ijt} \ge R_{ij} + Y_{it} - 1, \forall i,j,t$$

Non-negativity requirements:

$$R_{ij} = 0/1; Y_{it} = 0/1; Z_{ijt} \ge 0$$

An IP solver (e.g., CPLEX) can be used to find a feasible solution. Once an optimized job scheduling is provided by the solver, the backup jobs can be ordered by the assigned "start" timestamps, and then the backup application can schedule these jobs in the determined order. This schedule is the bin-packing schedule.

A modified process may be used for single tape drives. Often, system administrators manually create the so-called backup groups, which are assigned to different tape drives for processing. This helps in controlling the number of tapes that are used for different mount points of the same client 140a-c, thereby avoiding having different file systems of the client machine from being written to different tapes. This situation can be especially unacceptable for smaller client machines when the backed up client data is spread across multiple tapes. Therefore, in the case of a backup group, a given set of backup jobs (a specified backup group) is assigned for processing to a particular tape drive.

If there are n jobs (i=1, 2 ... n) and a single tape drive (e.g., 115a) for backup processing, then the IP formulation can be simplified as follows. First, the following variables are defined. $Y_{it}$ is a 0/1 variable, indicating whether job i starts its run at time t. S is the makespan of the entire backup session. A lower and upper bound of makespan S ($M_{low}$ and $M_{up}$ respectively) are determined similarly as already discussed above.

Assuming that job i will need to finish by period $t = M_{up}$, then job i needs to start no later than $t = M_{up} - d_i + 1$.

$$\sum_{t=1}^{M_{up}-d_i+1} Y_{it} = 1, \forall i$$

The jobs that are processed concurrently by the same tape drive (e.g., 115a) have to satisfy a given tape drive capacity constraint. That is, the combined bandwidth requirements should be less than or equal to maxTput (total $M_{up}$ inequalities).

$$\sum_{i=1}^{n} w_i \cdot \left( \sum_{t'=t-d_i+1}^{t} Y_{i,t'} \right) \leq \max Tput, \forall\, t$$

The maximum of maxDA concurrent jobs can be assigned to the tape drive (e.g., 115a) at any time t.

$$\sum_{i=1}^{n} \left( \sum_{t'=t-d_i+1}^{t} Y_{i,t'} \right) \leq \max DA, \forall\, t$$

Each job finishes the backup processing within time duration S, formally defining S as a makespan of the backup session.

$$t \cdot \left( \sum_{t'=t-d_i+1}^{t} Y_{i,t'} \right) \leq S, \forall\, i,\, t\colon t \geq M_{low}$$

It is noted that the number of variables, equations and inequalities is significantly reduced compared to the general case of multiple tape drives 115a-d.

EXAMPLE

In this example, data from six backup servers were used to evaluate the performance benefits of the new bin-packing schedule, and compare its performance with already optimized LBF scheduling. The client machines included a variety of Windows and Linux desktops. In addition, there is a collection of servers with a significant amount of stored data. The computing infrastructure is typical of a medium-size enterprise environment.

Figure 2A:
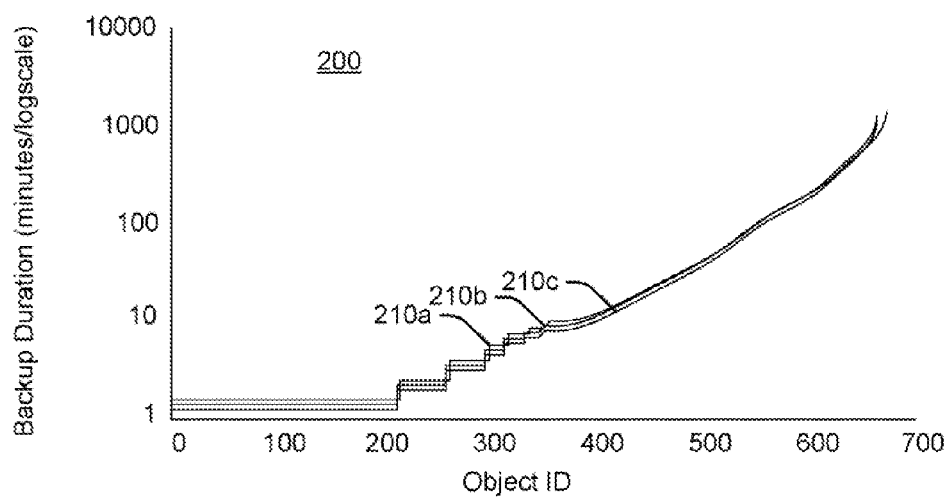
FIG. 2(a) is a plot showing an example of object duration distribution for three consecutive, full weekly backups.
Figure 2B:
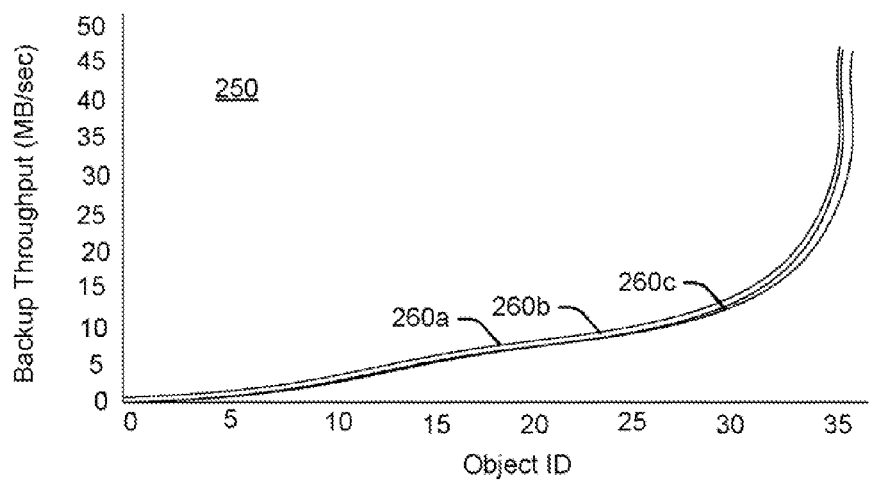
FIG. 2(b) is a plot showing an example of historic snapshots of backup job throughput.

There were 665 objects in the overall backup set. FIG. 2(a) is a plot 200 showing the object duration distribution in the overall set (sorted in increasing order) for three consecutive, full weekly backups (210a-c corresponding to week 1, week 2, and week 3, respectively). There is significant diversity in durations. Some object backups took only 1 min while other objects took 10-17 hours. There was also a significant number of "long" backup jobs. It can be seen in FIG. 2(a) that about 20% of all the jobs performed by these backup servers are in the range of 1-17 hours. FIG. 2(b) is a plot 250 showing historic snapshots (260a-c corresponding to week 1, week 2, and week 3, respectively) of backup job throughputs in the overall set from the six backup servers (sorted in increasing order). There was a significant diversity in observed job throughputs, ranging from 0.1 MB/s to 40 MB/s.

The servers have four tape drives 115a-d (with a maximum data rate of 80 MB/s), each configured with four concurrent DAs 120a-d. As can be seen in FIG. 2(b), there was a representative fraction of backup jobs with throughputs above 20 MB/s. However, at the same time, there was a significant fraction of backup jobs with lower throughputs. Therefore a fixed number of four concurrent DAs 120a-d used by the LBF scheduler and the traditional backup device does not make the best use of available resources of the tape drive.

To set a base line for a performance comparison, given workloads were processed using LBF scheduling in the traditional tool architecture configured with a single tape drive 115a-d and a fixed number of four concurrent DAs 120a-d per tape drive. Then the same workloads (from six backup servers) were processed with a new bin-packing schedule. The backup servers were configured with a single tape drive 115a-d and the following parameters: no more than 10 concurrent disk agents were used for each tape drive (maxDA=10); and the aggregate throughput of the assigned concurrent objects for each tape drive did not exceed 80 MB/s (maxTput=80 MB/s).

Table I shows the absolute and relative reduction in the overall backup session times when the bin-packing schedule is used instead of LBF.

TABLE I

| Backup Server | Absolute and Relative Reduction of the Overall Backup Time | | |
|---|---|---|---|
| | week1 | week2 | week3 |
| Server1 | 665 min (35%) | 651 min (34%) | 675 min (35%) |
| Server2 | 340 min (33%) | 212 min (24%) | 163 min (19%) |
| Server3 | 922 min (52%) | 928 min (52%) | 920 min (52%) |
| Server4 | 520 min (44%) | 552 min (44%) | 534 min (43%) |
| Server5 | 126 min (33%) | 124 min (33%) | 165 min (39%) |
| Server6 | 231 min (28%) | 190 min (26%) | 234 min (29%) |

The bin-packing schedule was created with additional information on both job duration and its throughput (observed from the past measurements). This additional information on job throughput was used to schedule a higher number of concurrent backup jobs (when it is appropriate) in order to optimize throughput of the tape drive.

Accordingly, significant time savings were achieved across all six backup servers using the bin-packing job scheduling as compared to the LBF schedule. In this example, the absolute time savings ranged from 124 min to 928 min. These results were consistent for three consecutive weeks. The relative performance benefits and reduction in the backup time were 19%-52% and depended on the specifics of workload, including for example, the size and throughput distribution of objects the backup server is responsible for.

The bin-packing schedule results discussed above were for a single tape drive which was formulated in a significantly more compact and efficient way than a multi-tape drive IP formulation.

In order to understand the performance benefits and efficiency of the designed IP approach for multi-tape drive configurations, the overall set of backup jobs from the six backup servers was used as a baseline (the set consisted of 665 jobs), and then different backup set "samples" were created of a given size. Multiple different backup sets with 100, 200, 300, and 400 jobs were generated; four "samples" of each size. Thus, there were sixteen different backup sets of different size, but with representative characteristics of real workloads.

The backup sets with 100 and 200 jobs were used for evaluating single and double tape drive configurations. The backup sets with 300 and 400 jobs were used for evaluating a full spectrum of one to four tape drive configurations.

Figure 3:
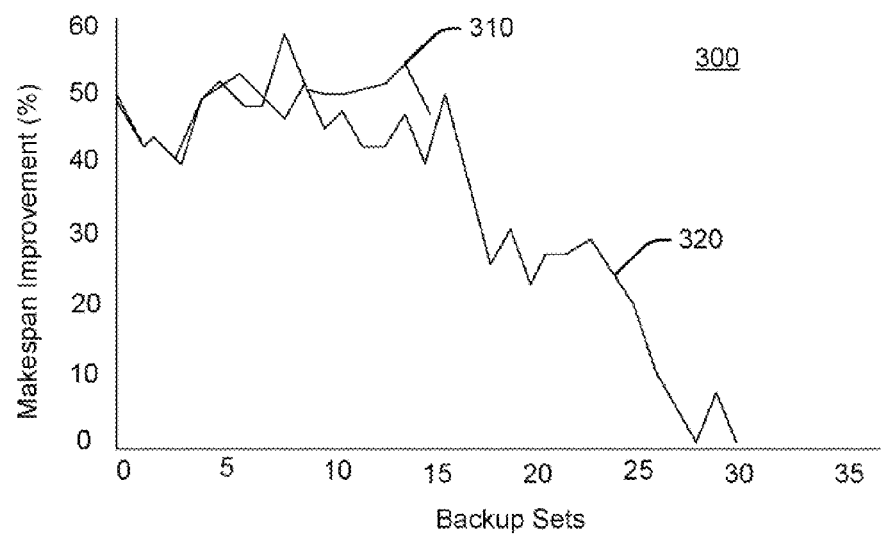
FIG. 3 is a plot showing an example of the relative reduction of the backup session makespan using the generated bin-packing schedule.

FIG. 3 is a plot 300 showing the relative reduction of the backup session makespan using the bin-packing schedule (compared to using the LBF schedule). The first set of results 310 represents performance benefits of the bin-packing schedule for a single tape drive 115a-d. These results were obtained by simulating the backup processing of sixteen different backup sets (4×100 jobs, 4×200 jobs, 4×300 jobs, and 4×400 jobs). As can be seen in FIG. 3, performance savings were significant for all backup sets. The makespan reduction with bin-packing schedule was consistently high (e.g., a 40% to 60% decrease in the backup processing time).

The second set of results 320 represents performance benefits using the bin-packing schedule for a multi-drive configuration. Again, the bin-packing schedule significantly outperformed the LBF schedule, and only when the makespan was explicitly bounded by the duration of the longest job, did both bin-packing and LBF schedule produce similar results.

Figure 4:
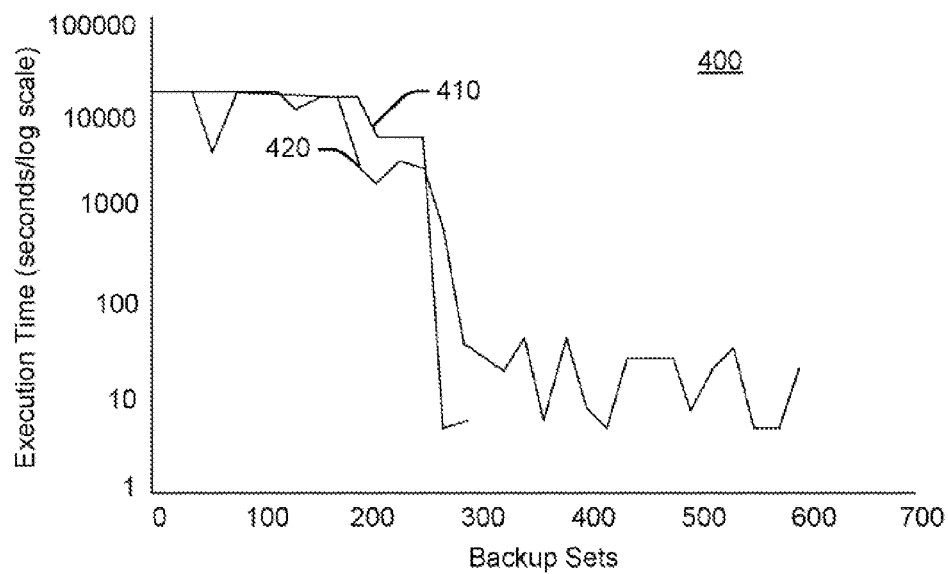
FIG. 4 is a plot showing an example of the solution time for finding a bin packing schedule.

FIG. 4 is a plot 400 showing the solution time for finding an optimized bin packing schedule for a single tape drive 410 and multiple tape drives 420. The solution time was bimodal. That is, either the optimal solution was found very quickly (within 10 sec-1.5 min), or it took a few hours to produce the result. It can be seen that there is a strong correlation between the reported solution time and the relationship of the two lower bounds $D_1$ and $D_2$ for the makespan.

This time represents the ideal processing of "all the bytes" in a given set of backup jobs at the maximum tape drive rate (multiplied by the number of drives) without any other configuration constraints of the backup server. The makespan S cannot be smaller than the "ideal" processing time of the backup set.

The relationship between $D_1$ and $D_2$ helps explain the "complexity" of the backup job scheduling problem. When D1≥D2, then D1 defines the lower bound of the makespan and the ideal processing of all the jobs at the maximum disk drive rate completes earlier than D1. In this case, the duration of the longest job strongly impacts the makespan. The difference between D1 and D2 determines the size of the "extra room" for making different job scheduling choices. Typically, this case means that the solver can quickly find the near-optimal or optimal solution by scheduling the longest job as one of the first jobs, and often the remaining jobs might be scheduled in a flexible way without impacting the schedule makespan.

When D1≤D2, then D2 defines the lower bound of the makespan, and potentially there are many more possible schedules that have different makespan. The larger difference between $D_2$ and $D_1$ creates more and more choices for different schedule choices, and the problem becomes much harder to solve. Accordingly, the relationship between $D_1$ and $D_2$ can be defined as $Rel(D_1,D_2)=(D_2-D_1)/D_1$.

Figure 5:
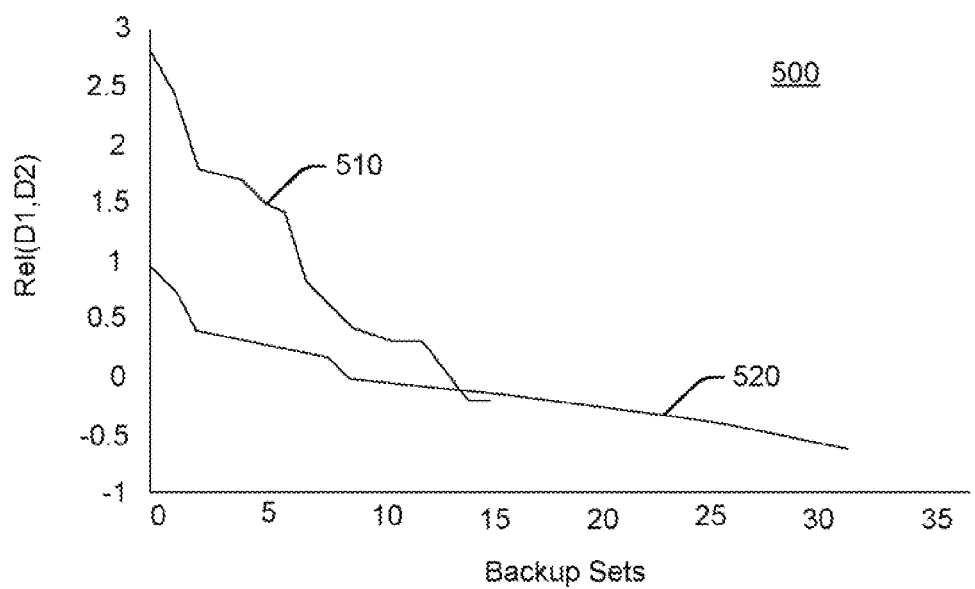
FIG. 5 is a plot showing an example of the computed values for $Rel(D_1,D_2)$.

FIG. 5 is a plot 500 showing the computed values for $Rel(D_1,D_2)$ in the above example for a single tape drive 510 and multiple tape drives 520. $Rel(D_1,D_2)$ has negative values when D1≥D2. The larger negative values are highly correlated with a fast solver runtime and chances of finding the near-optimal solution (as shown by the corresponding runtime values in FIG. 4). $Rel(D_1,D_2)$ has positive values when D1≤D2. The positive values of $Rel(D_1,D_2)$ are strongly correlated with a high runtime of the solver, as can be seen in FIG. 4.

The $Rel(D_1,D_2)$ metric correlates well with the solution time of the solver and therefore can be useful in its prediction.

It is apparent from the above description that the backup tools provide a variety of different means to system administrators for scheduling designated collections of client machines on a certain time table. Scheduling of incoming jobs and the assignment of processors is an important factor for optimizing the performance of parallel and distributed systems. The choice of the scheduling/assignment algorithm is driven by performance objectives. If the performance goal is to minimize mean response time then the optimal algorithm is to schedule the shortest job first. However, if there is a requirement of fairness in job processing, then processor-sharing or round-robin scheduling might be preferable.

For large-scale heterogeneous distributed systems, job scheduling is one of the main components of resource management. Many scheduling problems can be formulated as a resource constrained scheduling problem where a set of n jobs should be scheduled on m machines with given capacities.

Figure 6:
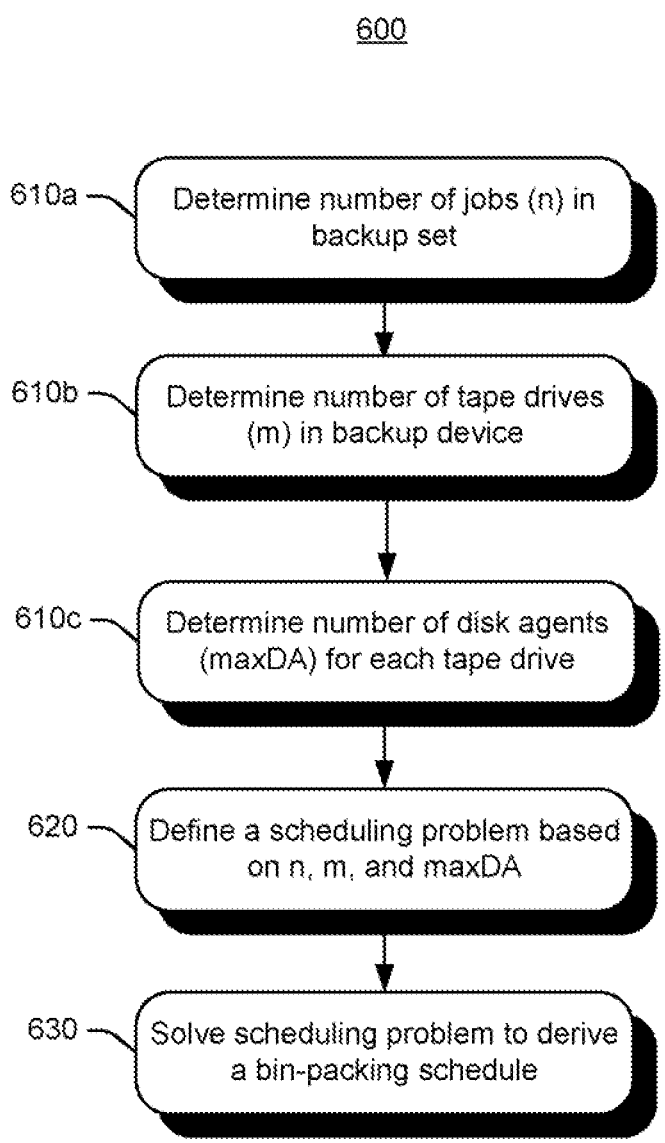
FIG. 6 is a flowchart illustrating exemplary operations which may be implemented for scheduling backup jobs.

FIG. 6 is a flowchart illustrating exemplary operations which may be implemented for scheduling backup jobs. Operations 600 may be embodied as logic instructions on one or more computer-readable medium. When executed on a processor, the logic instructions cause a general purpose computing device to be programmed as a special-purpose machine that implements the described operations. In an exemplary implementation, the components and connections depicted in the figures may be used.

In operation 610a-c, a number of jobs (n) in a backup set is determined, a number of tape drives (m) in the backup device is determined, and a number of concurrent disk agents (maxDA) configured for each tape drive is determined. In operation 620, a scheduling problem is defined based on n, m, and maxDA. The scheduling problem is solved in operation 630 using an integer programming (IP) formulation to derive a bin-packing schedule which minimizes makespan (S) for the backup set.

The operations shown and described herein are provided to illustrate exemplary implementations for scheduling backup jobs. It is noted that the operations are not limited to the ordering shown. Still other operations may also be implemented.

It is noted that the exemplary embodiments shown and described are provided for purposes of illustration and are not intended to be limiting. Still other embodiments are also contemplated.

The invention claimed is:

1. A method of enhanced backup job scheduling, comprising in a computing device:
   determining a number of jobs (n) in a backup set;
   determining a number of tape drives (m) in the backup device;
   determining a number of concurrent disk agents (maxDA) configured for each tape drive;
   defining a scheduling problem based on n, m, and maxDA;
   solving the scheduling problem using an integer programming (IP) formulation to derive a bin-packing schedule that minimizes makespan (S) for the backup set;
   determining a width for the maxDA of jobs processed in parallel, the width within a capacity (maxTput) of the tape drive; and
   starting backup processing.

2. The method of claim 1, further comprising estimating a lower bound (Mlow) and an upper bound (Mup) of S.

3. The method of claim 2, wherein Mlow and Mup are based on:
   D1 defined as a duration of the longest backup job in the set,
   D2 defined as a shortest possible time to process the entire set at maxTput, and
   D3 defined as shortest possible time to process the entire set at maxDA.

4. The method of claim 3, wherein Mlow=[max(D1,D2, D3)].

5. The method of claim 3, wherein Mup=[max(D1, D2, D3)/x], and a starting value for x is between about 0.85 and 0.95.

6. The method of claim 1, wherein S is greater than a longest backup job in the backup set.

7. The method of claim 1, wherein S is greater than a shortest possible time to process entire set.

8. A system for enhancing scheduling of backup jobs, comprising:

a solver stored on non-transitory computer-readable program code and executed by a processor to derive a bin-packing schedule based on a number of jobs (n) in a backup set, a number of tape drives (m) in the backup device, and a number of concurrent disk agents (maxDA) configured for each tape drive;

the solver further executed by the processor to determine a width for the maxDA of jobs processed in parallel, wherein the width is within a capacity (maxTput) of the tape drives; and wherein the bin-packing schedule is derived by the solver by solving a scheduling problem with an integer programming (IP) formulation, the bin-packing schedule minimizing makespan (S) for the backup set.

9. The method of claim 1, further comprising approximating a low bound on the makespan S.

10. The system of claim 8, wherein the bin-packing schedule is tailored based on available historical information and workload profile.

11. The system of claim 8, further comprising a scheduler configured to order the jobs in the backup set by assigning "start" timestamps based on the bin-packing schedule.

12. The system of claim 8, wherein the bin-packing schedule is determined for a single tape drive configuration.

13. The system of claim 8, wherein the bin-packing schedule is determined for a multiple tape drive configuration.

14. The system of claim 8, wherein the tape drives are virtual storage locations.

15. The system of claim 8, wherein the solver estimates a lower bound (Mlow) and an upper bound (Mup) of S.

16. The system of claim 15, wherein Mlow and Mup are based on:
   D1 defined as a duration of the longest backup job in the set,
   D2 defined as a shortest possible time to process the entire set at maxTput, and
   D3 defined as shortest possible time to process the entire set at maxDA.

17. The system of claim 16, wherein Mlow=[max(D1,D2,D3)].

18. The system of claim 8, wherein Mup=[max(D1, D2, D3)/x], wherein a starting value for x is between about 0.85 and 0.95.

19. The system of claim 8, wherein S is greater than a longest backup job in the backup set and S is greater than a shortest possible time to process entire set.

* * * * *